United States Patent [19]

Kirby

[11] Patent Number: 5,032,476
[45] Date of Patent: * Jul. 16, 1991

[54] INTERNAL HYDROSTATIC PUMP FOR A MOBILE VEHICLE BATTERY

[75] Inventor: Ronald F. Kirby, St. Francis, Wis.
[73] Assignee: Globe-Union, Inc., Milwaukee, Wis.
[*] Notice: The portion of the term of this patent subsequent to Oct. 16, 2007 has been disclaimed.
[21] Appl. No.: 555,044
[22] Filed: Jul. 19, 1990
[51] Int. Cl.$^5$ .............................................. H01M 2/38
[52] U.S. Cl. ........................................ 429/81; 429/67
[58] Field of Search ...................... 429/81, 51, 72, 67

[56] References Cited
U.S. PATENT DOCUMENTS

| 529,199 | 11/1894 | Schoop | 429/51 |
|---|---|---|---|
| 1,376,257 | 4/1921 | Cook | 429/81 |
| 4,963,444 | 10/1990 | Delaney | 429/67 |

*Primary Examiner*—Anthony Skapars
*Attorney, Agent, or Firm*—Foley & Lardner

[57] ABSTRACT

A hydrostatic pump for application in a battery experiencing sudden changes in velocity or direction as in a golf cart. The cells of the battery are provided with hydrostatic pumps separated from the walls of the cell and using the motion induced surface waves in the electrolyte to develop localized hydrostatic heads and create circulation in the electrolyte. The structure of the pumps additionally nullifies the otherwise detrimental effect of upward surge of electrolyte cause by the same change in velocity or direction.

7 Claims, 1 Drawing Sheet

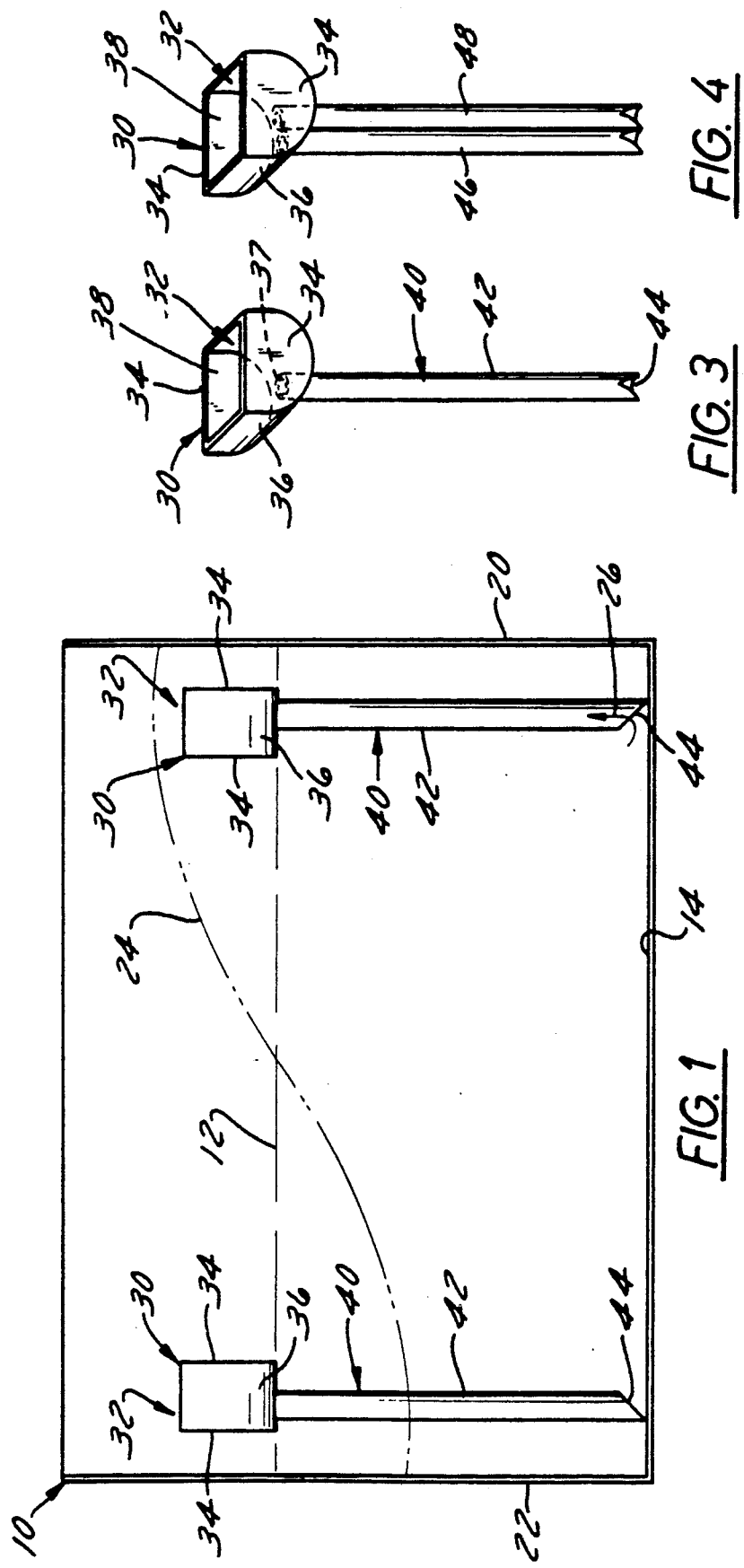

INTERNAL HYDROSTATIC PUMP FOR A MOBILE VEHICLE BATTERY

BACKGROUND OF THE INVENTION

This application is related to U.S. Pat. Application Ser. No. 07/358,688 filed May 30, 1989 and assigned to the same assignee as the present application.

This invention relates generally to batteries and more specifically to batteries which benefit from electrolyte circulation.

It has been known that in secondary batteries such as those typified by lead acid batteries using aqueous sulfuric acid or liquid electrolyte that the electrolyte tends to stratify when cycled due to varying densities. The stratification becomes aggravated during charge and recharge, affects cell performance and reduces battery life time. Additionally, ambient heat and efficient distribution of the internally generated heat are problems where the electrolyte is essentially stagnate.

The prior art is replete with examples of various devices used to circulate electrolyte in secondary batteries or otherwise prevent stratification. U.S. Pat. No. 916,320 issued on Mar. 23, 1909 to H.F. Joel illustrates a technique of tapering a center electrode relative to the separators such that the gas collecting on either side of the separator moves upward and accumulates in ever narrowing passageways, forcing electrolyte as bubbles up through orifices at the top and then over to the outside of the outer electrode where it moves downward. According to the patentee this draws the denser electrolyte from the bottom of the battery. U.S Pat. No. 2,584,117 issued on Feb. 5, 1952 to Elrod Jr. also recognized the problem and proposed the use of an air blown device to aerate the electrolyte to alter the density thereof to create circulation. Still another U.S. Pat. 4,283,467 issued Aug. 11, 1981 to Gutlich, et al. discloses a device that also utilizes gas to alter electrolyte density. U.S. Pat. No. 4,308,322 issued Dec. 29, 1981 to Hammar describes a pump within the battery comprising a gas collecting hood and passageways which utilize the generated gas to carry electrolyte as bubbles to the passageways, thus inducing circulation. Another design to reduce stratification is disclosed in U.S. Pat. 4,619,875 issued Oct. 28, 1986 to D.W. Stahura, et al. in which the separator has a plurality of laterally extending concave ribs on the surface thereof that act to trap the more dense electrolyte.

U.S. Pat. No. 529,199 issued Nov. 13, 1984 to Schoop provides several different embodiments of a device which serve to redistribute electrolyte in a battery. One particularly interesting embodiment involves the use of a planar member which forms a wall that is positioned adjacent and inside one of the back walls of a battery cell and extends across to each of the side walls thereof. The top side of the wall extends above the at-rest surface of the liquid electrolyte and terminates short of the cell base, providing an opening. When the electrolyte is disturbed by, for example, a sudden change of motion of the cell, the electrolyte fills the volume confined by the wall and the cell walls and forms a hydrostatic head. By gravity the head dissipates and the movement of electrolyte through the opening provides a beneficial circulation which equilibrates the undesirable temperature differentials and density gradients which otherwise forms during use in the electrolyte. To compensate for upward surge of electrolyte (which would effectively destroy the formation of the hydrostatic head and thus the beneficial currents), the patentee uses a one-way valve mechanism which closes the channel behind the wall to upward moving currents.

In the referenced co-pending application Ser. No. 07/358,688, incorporated by way of reference herein, it is demonstrated that the valve mechanism can be eliminated by making the average horizontal cross-sectional area of the mouth region, i.e., that portion of the volume enclosed by the wall and cell walls above the at-rest surface of the electrolyte, sufficiently greater than the average horizontal cross-sectional area of the throat volume. The upward surge of electrolyte dissipates before interfering with the formation of the hydrostatic head. The paramount advantage of the pump as described therein is the elimination of a moving part without reduction in effectiveness of the pump.

In some battery environments it would be desirable to have a pump which provides the same desirable result but which is separate from the walls of the cell. The foregoing addresses this situation as will be readily apparent from the ensuing description of a preferred embodiment of the invention.

SUMMARY OF THE INVENTION

A hydrostatic pump in accordance with one embodiment of the present invention has no moving parts and utilizes the change in velocity of a vehicle in which a battery incorporating the invention is placed to thoroughly mix the electrolyte in the battery. The invention comprises a hydrostatic pump element in the form of a device separated from the walls of the cell which utilizes waves created in the battery cell electrolyte due to disturbances caused by movement of the vehicle in which the battery is placed. The pump device includes a mouth defined by a circumferential wall or walls which, when the pump is operatively positioned within the cell, protrudes substantially above the at-rest surface of the liquid electrolyte within the cell. The mouth is open to the cell volume. Additionally included is a throat which communicates with the mouth and is defined by a circumferential wall or walls. The throat protrudes substantially below the at-rest surface of the electrolyte and has an opening proximate to the base of the cell communicating with the cell volume. When the cell is disturbed, causing waves in the electrolyte, the mouth is filled with electrolyte, creating a hydrostatic head. The upward surge of electrolyte in the throat is minimized by ensuring the average, substantially horizontal cross-sectional area of the mouth is sufficiently greater than the average, substantially horizontal cross-sectional area of the throat. Gravity action upon the hydrostatic head causes electrolyte to move downward in the throat and then outward through the opening communicating with the electrolyte volume outside of the confined region. This movement stimulates flow currents within the electrolyte, reducing electrolyte stratification and increasing heat transfer efficiency.

BRIEF DESCRIPTION OF THE DRAWINGS

FIG. 1 is a schematic inside view of a battery cell supplied with a pair of hydrostatic pumps in accordance with a preferred embodiment of the present invention;

FIG. 2 is a top view of the cell of FIG. 1 showing the pumps bridging the cell side walls;

FIG. 3 is a side perspective view of a hydrostatic pump in accordance with a preferred embodiment of the present invention; and FIG. 4 is a side perspective view of another construction of a hydrostatic pump in accordance with the present invention.

DETAILED DESCRIPTION OF THE PREFERRED EMBODIMENT

Reference is now made to the schematic of FIG. 1 in which a pair of hydrostatic pumps 30 are shown positioned within a battery cell 10 having a volume enclosing electrolyte shown within at-rest surface 12. Each pump 30 has a mouth 32 formed by a pair of moon-shaped side walls 34 (best seen in FIG. 3) connected by curved wall 36. Walls 34 and 36 define an opening 38 which communicates with the volume defined by cell 10. Mouth 32 is preferably positioned such that the volume contained therein is substantially above at-rest surface 12. The curved wall 36, as explained below, tends to funnel the liquid forming a hydrostatic head downwardly toward an opening 37 in wall 36.

Pump 30 also has a throat portion 40 shown herein as a pipe 42 suitably joined in a liquid tight manner to mouth 32 along the bottom of wall 36 and provides communication therebetween via opening 37. The volume enclosed by pipe 42 communicates with the mouth 32 and is preferably positioned below the at-rest surface 12. Additionally, pipe 42 which may rest against the base 14 of cell 10 is provided with at least one opening 44 communicating with the cell volume.

Pump 30 may be fixed within cell 10 in any desired fashion such as, for example, by bridging the side walls 16 and 18 of cell 10 and being suitably secured thereto, for example, by an appropriate adhesive or press fit against side walls 16 and 18. In this manner, pump 30 is independent of the location of end walls 20 and 22 although it is usually desirable to locate pumps 30 closely proximate thereto.

Pump 30 may be fabricated from any materials inert with respect to the electrolyte and chemical reactions occurring within the cell. Preferably, pump 30 may be made from a thermoplastic material in an injection molding process.

In process, when cell 10 experiences a change in its motion, i.e., an acceleration, a disturbance is created within the electrolyte causing a wave 24 to form and a filling of mouth 32 with electrolyte. Since mouth 32 is above at-rest surface 12, a hydrostatic head of electrolyte is created within mouth 32. At the same time, wave 24 is formed and for the same reason, a surge of electrolyte, depicted by arrow 26, is induced to move up pipe 42. Because the relative horizontal cross-sectional area of mouth to throat is sufficiently large, the surge is relatively insignificant with respect to the hydrostatic head and dissipates rapidly, leaving the hydrostatic head largely intact. As long as the upward surge is effectively dissipated, the relative cross-sectional area is not critical although it is preferred that the ratio be about 2.5 or greater.

The hydrostatic head in pump 30 then descends to the level of at-rest surface 12 and electrolyte flows out opening 44 and across base 14 in the form of an electrolyte circulating current. As discussed in the aforementioned co-pending application, the circulation improves efficiency by equilibrating temperature differentials and density gradients in the electrolyte.

From the foregoing, the advantages of a separate standing hydrostatic pump can be appreciated. Various modifications and alterations will become readily apparent without departing from the spirit of the appended claims such as, for example, the use of a plurality of pipes depicted as a pair of pipes 46, 48 in FIG. 4.

I claim:

1. A battery cell having end walls, side walls and a base for enclosing a cell volume partially filled with electrolyte having an at-rest surface and including at least one hydrostatic pump positioned within said volume and displaced from said end walls, comprising a first wall portion enclosing a mouth volume positioned substantially above said at-rest surface and a second wall portion enclosing a throat volume positioned substantially below said at-rest surface, aid second wall portion being a pipe connected at one end to said first wall portion and having the other end thereof terminating above said cell base, said mouth volume communicating with said cell volume above said at-rest surface and said throat volume communicating with said cell volume below said at-rest surface, said mouth volume having an average horizontal cross-sectional are sufficiently greater than the average horizontal cross-sectional area of said throat volume so as to minimize the upward surge of electrolyte in said throat volume when said electrolyte is disturbed due to change in motion of said cell.

2. In the cell of claim 1, said second wall portion being a plurality of pipes each connected at one end of said first wall and having the other end thereof terminating above said cell base.

3. In the cell of claim 1, said first wall portion being formed by a pair of side walls joined together by a connecting wall.

4. In the cell of claim 3, said second wall portion intersecting said connecting wall.

5. In the cell of claim of claim 1, said hydrostatic pump being fixed between said side walls.

6. In the cell of claim 1, the ratio of said mouth volume to said throat volume being at least about 2.5.

7. In the cell of claim 1, said hydrostatic pump being located preferably proximate one of said end walls.

* * * * *

UNITED STATES PATENT AND TRADEMARK OFFICE
CERTIFICATE OF CORRECTION

PATENT NO. : 5,032,476

DATED : July 16, 1991

INVENTOR(S) : Ronald F. Kirby

It is certified that error appears in the above-identified patent and that said Letters Patent is hereby corrected as shown below:

Column 4, line 26, delete "aid" and insert --said--;
Column 4, line 33, delete "are" and insert --area--.

Signed and Sealed this

Third Day of November, 1992

Attest:

DOUGLAS B. COMER

*Attesting Officer*   Acting Commissioner of Patents and Trademarks